(12) United States Patent
Eckert et al.

(10) Patent No.: US 6,902,750 B2
(45) Date of Patent: *Jun. 7, 2005

(54) METHOD FOR THE MANUFACTURE OF PROCESS CHEESE

(75) Inventors: Jason D. Eckert, Centerville, MN (US); Margaret A. Swearingen, Shoreview, MN (US); Edward B. Aylward, Woodbury, MN (US); Craig J. Schroeder, Lino Lakes, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/368,276

(22) Filed: Feb. 18, 2003

(65) Prior Publication Data

US 2004/0022920 A1 Feb. 5, 2004

Related U.S. Application Data

(63) Continuation-in-part of application No. 10/210,956, filed on Aug. 2, 2002.

(51) Int. Cl.⁷ .............................................. A23C 9/12
(52) U.S. Cl. ............................ 426/39; 426/36; 426/38; 426/519; 426/582
(58) Field of Search ........................... 426/34, 36, 38, 426/39, 40, 42, 43, 580, 582, 519

(56) References Cited

U.S. PATENT DOCUMENTS

| | | | |
|---|---|---|---|
| 2,701,202 A | 2/1955 | Silberman | 99/116 |
| 2,701,204 A | 2/1955 | Strezynski | 99/116 |
| 3,079,263 A | 2/1963 | Foster, Jr. et al. | 99/116 |
| 3,172,767 A | 3/1965 | Foster, Jr. et al. | 99/116 |
| 3,406,076 A | 10/1968 | Little | 99/116 |
| 3,482,997 A | 12/1969 | Murray et al. | 99/116 |
| 3,507,750 A | 4/1970 | Murray et al. | 195/66 |
| 3,697,293 A | 10/1972 | Breidenstein | 99/116 |
| 3,698,918 A | 10/1972 | Goujard | 99/116 |
| 3,845,226 A | 10/1974 | Goujard | 426/239 |
| 3,882,250 A | 5/1975 | Loter et al. | 426/39 |
| 3,953,610 A | 4/1976 | Little | 426/39 |
| 4,053,643 A | 10/1977 | Corbin, Jr. | 426/40 |
| 4,066,791 A | 1/1978 | Corbin, Jr. | 426/39 |
| 4,199,609 A | 4/1980 | Metz | 426/582 |
| 4,389,425 A | * 6/1983 | Burr, II | 426/598 |
| 4,444,800 A | 4/1984 | Bixby et al. | 426/582 |
| 4,459,313 A | 7/1984 | Swanson et al. | 426/39 |
| 4,499,109 A | 2/1985 | Christiansen et al. | 426/36 |
| 4,689,234 A | 8/1987 | Ernstrom et al. | 426/38 |
| 4,713,254 A | 12/1987 | Childs et al. | 426/582 |
| 4,734,287 A | 3/1988 | Singer et al. | 426/41 |
| 4,959,229 A | 9/1990 | Reddy et al. | 426/39 |
| 4,980,179 A | 12/1990 | Koenraads et al. | 426/36 |
| 5,061,503 A | 10/1991 | Kong-Chan et al. | 426/582 |
| 5,063,074 A | 11/1991 | Kahn et al. | 426/585 |
| 5,130,148 A | 7/1992 | Brown et al. | 426/36 |
| 5,175,015 A | 12/1992 | Kahn et al. | 426/585 |
| 5,447,731 A | 9/1995 | Pedersen et al. | 426/36 |
| 5,470,593 A | 11/1995 | Meilinger et al. | 426/36 |
| 5,472,718 A | 12/1995 | Ijsseldijk et al. | 426/38 |
| 5,532,018 A | 7/1996 | Miller et al. | 426/582 |
| 5,709,900 A | 1/1998 | Miller et al. | 426/582 |
| RE35,728 E | 2/1998 | Bixby et al. | 426/582 |
| 5,766,330 A | 6/1998 | Knights et al. | 106/124.2 |
| 5,895,671 A | 4/1999 | Adamany et al. | 426/36 |
| 5,942,263 A | 8/1999 | Chen et al. | 426/38 |
| 6,060,093 A | 5/2000 | Davis et al. | 426/74 |
| 6,096,870 A | 8/2000 | Mozaffar et al. | 530/366 |
| 6,110,509 A | 8/2000 | Nauth et al. | 426/41 |
| 6,139,901 A | 10/2000 | Blazey et al. | 426/656 |
| 6,183,805 B1 | 2/2001 | Moran et al. | 426/582 |
| 6,214,404 B1 | 4/2001 | Han et al. | 426/582 |
| 6,224,914 B1 | 5/2001 | Han et al. | 426/36 |
| RE37,264 E | 7/2001 | Chen et al. | 426/38 |
| 6,258,389 B1 | 7/2001 | Adamany et al. | 426/34 |
| 6,299,914 B1 | 10/2001 | Christiansen et al. | 426/74 |
| 6,322,841 B1 | 11/2001 | Jackson et al. | 426/582 |

FOREIGN PATENT DOCUMENTS

WO    WO 02/089592 A1    11/2002

* cited by examiner

*Primary Examiner*—Leslie Wong
(74) *Attorney, Agent, or Firm*—Westman, Champlin & Kelly, P.A.

(57) ABSTRACT

A method for eliminating the uncooked curd defect in process cheese products associated with fortification of milk during the natural cheese make process. This fortification results in a significant increase in the amount of calcium bound in the casein micelle. The fortified milk is subjected to an acid or acid producing material that quickly lowers the pH either before or after pasteurization to a pH of approximately 6.6 to 5.70. The acidification is performed under turbulent conditions to maintain milk protein native integrity. The acidification step results in a significant migration of calcium out of the casein micelle and into a soluble form that is carried away with the whey stream. The acidified fortified milk is then subjected to the conventional cheese making process. The resulting natural cheese can then be further processed into a process cheese product without the risk of uncooked curd particles in the finished product.

28 Claims, No Drawings

METHOD FOR THE MANUFACTURE OF PROCESS CHEESE

CROSS-REFERENCE TO RELATED APPLICATION(S)

This is a continuation-in-part of application Ser. No. 10/210,956; filed Aug. 2, 2002; entitled METHOD FOR CHEESE MANUFACTURE.

BACKGROUND OF THE INVENTION

The present invention relates to a process for eliminating the defect of uncooked cheese curd in process cheese. More particularly, the present invention provides a process for the manufacturing of cheese to be used as an ingredient in processed cheese from pre-acidified fortified milk resulting in a curd that is an improved ingredient for the manufacture of process cheese. Pre-acidification reduces cheese calcium, conditioning the cheese proteins such that the cheese is easily and completely converted into a continuous molten process cheese with the addition of emulsifying salts and heat.

Cheese for use as an ingredient in process cheese is typically made by developing acidity in milk with starter cultures and coagulated with a clotting agent such as rennet. The cheese milk can be fortified with dairy solids (ultra-filtered milk, milk protein concentrate, non-fat dry milk, skim, part skim or whole milk condensed) and has been utilized for many years to improve plant throughput thus improving plant efficiency. After the milk has been set with a coagulant it is cut and then whey is separated from the resulting curd. The curd is pressed into a useable form and the separated whey is generally further processed for protein and fat recovery. The formed curd may be used to prepare process cheese type products by grinding and then heating the curd with an emulsifying salt(s).

The label name given to the resulting process cheese type products depends on its ingredients, process and composition and is defined by the U.S. Food and Drug Administration 21 CFR §§133.169–180. The term "pasteurized process cheese" refers to a food prepared by comminuting and mixing with the aid of heat a blend of cheeses, emulsifying salts, water, milkfat and optional colorings or flavorings into a homogeneous plastic mass. The term "pasteurized process cheese food" refers to a product that is similar in nature to pasteurized process cheese but may contain optional dairy ingredients. The maximum moisture level in a cheese food is 44% and the minimum fat level is 23%. The term "pasteurized process cheese spread" refers to a product that is similar in nature to a cheese food but may contain optional ingredients such as gums and sweetening agents. The maximum moisture level in a cheese spread is 60% and the minimum fat level is 20%. Pasteurized process cheese, cheese food and cheese spread are commonly referred to as "standardized products" meaning that they adhere to the Federal Standards of Identity as spelled out in the Code of Federal Regulations.

As used herein, the term "process cheese products" includes those products known and referred to as "pasteurized process cheese", "pasteurized process cheese food", "pasteurized process cheese spread". In addition, "process cheese products" include all types of products that resemble standardized process cheese in flavor and/or texture but do not meet the guidelines in the Code of Regulations regardless of reason. This includes products that do not meet the compositional requirements or that contain ingredients that are not provided for in 21 CFR §§133.169–180.

Acidification of milk prior to cheesemaking has been well documented. For example, Reddy et al. patent (U.S. Pat. No. 4,959,229) discusses acidification of milk after pasteurization in conjunction with elevated pasteurization temperatures of 185° F. for 16 seconds as having a significant effect on increasing whey protein retention. Acidification of cheese milk was between pH 5.7 and 6.4.

The Brown el al. patent (U.S. Pat. No. 5,130,148) also discusses acidification as a method to avoid an acid coagulum that is weak and prone to shattering.

The Ernstrom et al. patent (U.S. Pat. No. 4,689,234) discusses the use of acidification as a method to facilitate calcium removal during ultra-filtration and dia-filtration steps when milk is acidified to a pH range of 5.6–6.2. Milk is concentrated until the ultra-filtered retentate comprises 15–30% of the original weight then acidified by an acid or acid producing material to a pH of about 4.9–5.6. Following fermentation a coagulant is added for curd development.

The Foster et al. patent (U.S. Pat. No. 3,172,767) discuss adjusting downwardly the pH of whole milk indicating an improvement in the curd and clarity of the whey as the acidity of the milk was increased. Milk is acidified using a food grade acid to not lower than pH 4.6. The milk is then pasteurized and coagulated at 85–180° F.

BRIEF SUMMARY OF THE INVENTION

The present invention includes a method for elimination of the uncooked cheese curd defect associated with process cheese products. In the manufacture of cheese, whole milk is fortified with additional dairy component(s) that increase the solids to a predetermined level for the type of cheese manufactured. This blend of milk and concentrated milk is subjected to an acid or acid producing material that quickly lowers the pH either before or alter pasteurization to a pH of approximately 6.6 to 5.70. Milk acidification is performed under turbulent conditions to maintain integrity of native proteins in the milk. This acidification step drives bound calcium out of the casein micelles and into a soluble form that is removed with the whey. Lactic acid producing starter cultures are inoculated into the milk and ripening time follows. A coagulant is added to the vat and a coagulum is formed from the acidified fortified milk. The coagulum is then cut, stirred and cooked. As this occurs, curds and whey are formed in the vat. The whey is drained from the curd and the curd is processed to form cheese. The curd is particularly suited for use as a cheese ingredient for making process cheese. As an alternative, the acidified fortified milk may be used directly into the manufacture of process cheese thereby skipping the formation of curds and whey.

DETAILED DESCRIPTION

The present invention provides a commercially viable method for producing a cheese from milk that has been fortified with dairy solids and by cheese milk acidification which results in calcium being forced out of the casein micelle and into the whey stream. This fortified, reduced calcium cheese could then be successfully used to make a process cheese product without the risk of incomplete emulsification and uncooked curd particles in the finished product. Prior to this invention, uncooked curd particles occurred when the milk was fortified with at least 14% additional milk solids.

Milk fortification to increase plant through-put has been in use in the dairy industry for quite some time. Fortification includes the addition of a dairy component that provides additional solids to the cheese making process. Such dairy components or concentrated milks include but are not limited to ultra-filtered milk, milk protein concentrate, non-fat dry milk, condensed skim, part skim or whole milk or any combination thereof. The addition of dairy components to cheese milk results in finished cheese with higher calcium than non-fortified cheeses of the same type. This increase in calcium changes the functionality of the cheese proteins in terms of aging/curing and processing.

As part of this discovery and invention, it has been found that slight acidification of fortified milk results in a significant calcium reduction in the finished cheese. The acidification step reduces the amount of total calcium bound to the casein micelle, and consequently increases the amount of calcium that can be removed with the whey. The resulting cheese curd therefore contains less total calcium than non-acidified fortified cheeses. The level of calcium in the finished cheese can be tailored to meet specific processed cheese product needs by increasing or decreasing the level of acidification at the cheese vat. The acidification process conditions the cheese protein such that the protein is more easily and completely reacting with emulsifying salts in the process cheese cooking process. This creates a more homogeneous continuous mass as compared to non-acidified fortified cheese that tends to resist the action of emulsification salts and results in un-cooked curd particles in the finished products.

Cheese milk acidification may be accomplished through the use of citric acid, an acidulant or any other organic, inorganic or acid producing bacteria. By slight acidification, it is meant decreasing the pH to 6.6 to 6.0, but a reduction to approximately pH 5.70 is also effective. Preferably, a 10% citric acid solution is used.

Acidification of the milk should be done quickly. By quickly, it is meant acidification by an acidulant such as an acid is preferred over an acid producing bacteria.

Integrity of native proteins of the milk should be maintained. Localization reduction of pH to the isoelectric point (pH 4.6 and below) should be avoided so as not to denature the native proteins. Turbulent conditions maintain milk protein native integrity by preventing any area of the milk to fall below the isoelectric point of milk (pH 4.6). Acidification may be accomplished using a metering pump, or an in-line injector in association with an in-line static mixer. Injecting acidulants at an elbow or "T" connection has also been found to provide sufficient turbulence. Milk may also be acidified in the blending tank under turbulent conditions. The temperature for acidification may vary greatly starting from just above freezing to 100° F.

The blend of whole and concentrated milk is subjected to an acid or acid producing material that quickly lowers the pH either before or after pasteurization to a pH of approximately 6.60 to 6.0, but down to approximately 5.70. This acidification step drives bound calcium out of the casein micelle and into a soluble form that is subsequently carried away with the whey.

Pasteurization is conducted under typical conditions required for legal pasteurization. For example, 163° F. for 16 seconds is one preferred time/temperature regime resulting in adequate pasteurization.

After pasteurization, the milk temperature is reduced to approximately 85–95° F., and the acidified, fortified milk is transferred to the cheese vat. Calcium chloride ($CaCl_2$) may also be added at levels governed by U.S. government regulations to firm the resulting curd. Lactic acid producing starter cultures are inoculated into the milk and ripening time follows. A coagulant is added to the vat and a coagulum is formed from the acidified fortified milk. The coagulum is then cut, stirred and cooked. As this occurs, curds and whey are formed in the vat. The whey is drained from the curd. The curd is salted and pressed into blocks or barrels. The curd can be used immediately without aging or curing.

The following examples are set forth for purposes of illustration only and are not to be construed as limitations on the invention.

EXAMPLE 1

The results of four vat runs are listed in Table 1 below for comparison purposes. One vat run started with whole milk and no ultrafiltered milk solids (no fortification). Another vat run included fortification with 1 ultra filtered whole milk solids to obtain a 14% Total solids target in the vat, with no pre-acidification. Two vats were run with the addition of ultra filtered milk solids increasing vat solids to 14% and were pre-acidified to 6.3 and 6.1 pH. In all cases the starting pH of the milk was approximately 6.6 to 6.65 pH. As Table 1 below shows, the total calcium content for the vat run with fortification and no pre-acidification (14% vat solids by addition of ultrafiltered whole milk) was greater than the vat run using whole milk with no fortification and much greater than the vat runs with fortification and pre-acidification.

TABLE 1

| Vat Run | Fortification with Ultra filtered milk solids to vat solids | Pre-Acidification | Yield as a Percentage (pounds cheese produced per 100 pounds milk or whole milk equivalents**) | Total Calcium* (mg/100 gm cheese) |
| --- | --- | --- | --- | --- |
| 1 | 14% | No pre-acidification | 10.36 | 799 |
| 2 | Whole milk no UF milk solids | No pre-acidification | 10.58 | 752 |
| 3 | 14% | PH 6.3 | 10.62 | 672 |
| 4 | 14% | PH 6.1 | 10.64 | 568 |

*Calcium by Atomic absorption
**Milk equivalents determined on a protein basis

EXAMPLE 2

The results of four additional comparative vat runs similar to the vat runs of Example 1, except that the fortification was increased to 15% vat solids by addition of ultra-filtered whole milk solids, are listed in Table 2 below. Again, a fortified milk vat run of 15% fortification was run with no pre-acidification. The fortified milk with no pre-acidification produced a total calcium content much greater than the vat run with whole milk with no fortification. The two vat runs with fortification of 15% ultrafiltered whole milk solids and pre-acidification produced a total calcium content significantly lower than the vat run with fortification but without pre-acidification.

TABLE 2

| Vat Runs | Fortification with Ultra filtered milk solid to vat solids | Pre-Acidification | Yield as a percentage (pounds cheese produced per 100 pounds milk or whole milk equivalents**) | Total Calcium* (mg/100 gm cheese) |
| --- | --- | --- | --- | --- |
| 1 | 15% | No pre-acidification | 10.32 | 795 |

TABLE 2-continued

| Vat Runs | Fortification with Ultra filtered milk solid to vat solids | Pre-Acidification | Yield as a percentage (pounds cheese produced per 100 pounds milk or whole milk equivalents**) | Total Calcium* (mg/100 gm cheese) |
|---|---|---|---|---|
| 2 | Whole milk no UF milk solids | No pre-acidification | 10.75 | 680 |
| 3 | 15% | pH 6.3 | 10.92 | 749 |
| 4 | 15% | pH 6.1 | 10.52 | 594 |

*Calcium by Atomic absorption
**Milk equivalents determined on a protein basis

The present invention is useful for all types of cheeses including those derived From a combination of components. The process of the present invention has been found to be particularly useful in the manufacture of cheese used as an ingredient in the manufacture of process cheese.

Typically the use of cheese that has been fortified and not pre-acidified has caused quality defects in the manufacture of process cheese products. Uncooked curd particles are a common result when cheese that has been fortified to levels greater than 14% solids is then used in the manufacture of process cheese products. The defect is attributed to the high level of calcium in the cheese creates a tightly bound casein structure. Shear and temperature associated with the manufacture of process cheese products is not great enough to completely break down the casein to a level that is conducive to the emulsification process. The end result is small translucent pieces of curd in the process cheese finished product which is viewed by the consumer as an inferior product.

Pre-acidification of fortified milk prior to the cheese making process has shown a significant migration of calcium out of the casein micelle and into a soluble form that is removed with the whey during draining of the curd. This migration results in a curd that is more similar to cheese that has not been fortified. This allows for the curd breakup under typical shear and temperature during the process cook step and facilitates proper emulsification of cheese in the manufacture of process cheese. The resulting process cheese product has no translucent pieces of curd.

EXAMPLE 3

The results of five process cheese runs are listed in Table 3 below for comparison purposes. One run started with a natural cheese made with whole milk and 15% additional concentrated whole milk solids and no pre-acidification. A second run included a natural cheese made with 15% additional concentrated whole milk solids and was pre-acidified to 6.04 pH. A third and fourth run included natural cheese made with 18% additional concentrated whole milk solids and was pre-acidified to 6.0 and 6.2 pH. A fifth run included natural cheese made with 20% additional concentrated whole milk solids and was pre-acidified to 6.1 pH. In all cases the starting pH of the milk was approximately 6.6 to 6.65 pH. As Table 3 below shows, the process cheese runs that utilized natural cheese which had been fortified and subjected to pre-acidification did not show the presence of translucent curd pieces in the process cheese finished product.

TABLE 3

| Process Cheese Run | Natural Cheese Fortification Level | Pre-Acidification | Finished Product Appearance |
|---|---|---|---|
| 1 | 15% | No pre-acidification | Multiple Translucent Curd Pieces |
| 2 | 15% | pH 6.04 | No Translucent Curd Pieces |
| 3 | 18% | pH 6.00 | No Translucent Curd Pieces |
| 4 | 18% | pH 6.20 | No Translucent Curd Pieces |
| 5 | 20% | pH 6.10 | No Translucent Curd Pieces |

Alternatively the fortified milk may be made from reconstituted dairy proteins and fat to produce a milk like slurry. This material may then be made into a cheese like product to be used in the production of process cheese products. The formation of curds and whey from the fortified milk or milk like slurry may or may not be eliminated and the product is used directly into the production of process cheese products.

Although the present invention has been described with reference to preferred embodiments, workers skilled in the art will recognize that changes may be made in form and detail without departing from the spirit and scope of the invention.

What is claimed is:

1. A method for making a process cheese product, the method comprising:
   fortifying milk with additional dairy solids up to a legally acceptable level for the making of cheese;
   acidifying the fortified milk to a pH of approximately 6.6 to 5.75 under turbulent conditions;
   forming a cheese from the acidified fortified milk;
   grinding the cheese and adding emulsifier salts thereto;
   cooking the cheese to produce a molten process cheese mass; and
   forming the molten process cheese mass to a useable form.

2. The method of claim 1 wherein the fortified milk is acidified after pasteurization.

3. The method of claim 1 wherein the fortified milk is acidified in-line in a region of turbulent flow.

4. The method of claim 1 wherein the fortified milk is acidified to a pH range of approximately 6.5 to 6.1.

5. The method of claim 1 wherein the fortified milk is acidified with an organic or inorganic acid or acid producing bacteria.

6. The method of claim 1 wherein the milk is fortified with at least 14% additional dairy solids.

7. A method for making a process cheese product, the method comprising:
   fortifying milk with additional dairy solids up to a legally acceptable level for the making of cheese;
   acidifying the fortified milk to a pH of approximately 6.6 to 5.75 under turbulent conditions;
   forming a coagulum from the acidified fortified milk;
   cutting the coagulum to separate curd and whey;
   draining the whey from the curd;
   processing the curd to form cheese;
   grinding the cheese and adding emulsifier salts thereto;
   cooking the cheese to produce a molten process cheese mass; and
   forming the molten process cheese mass to a useable form.

8. The method of claim 7 wherein the fortified milk is acidified after pasteurization.

9. The method of claim 7 wherein the fortified milk is acidified in-line in a region of turbulent flow.

10. The method of claim 7 and further comprising pasteurizing the fortified milk and wherein the fortified milk is acidified before pasteurization.

11. The method of claim 7 wherein the fortified milk is heat-treated before or after acidification.

12. The method of claim 7 wherein the fortified milk has neither been heat-treated or pasteurized.

13. The method of claim 7 wherein the fortified milk is acidified while flowing through a conduit under turbulent conditions.

14. The method of claim 13 wherein the turbulent flow occurs at a "T" connection.

15. The method of claim 13 wherein the turbulent flow occurs at an elbow.

16. The method of claim 13 wherein the acidification occurs in a batch tank under turbulent conditions.

17. The method of claim 7 wherein the fortified milk is acidified with citric acid.

18. The method of claim 17 wherein the fortified milk is acidified with an organic or inorganic acid or acid producing bacteria.

19. The method of claim 7 wherein the temperature of the fortified milk during acidification is less than 35° F. or greater than 100° F.

20. The method of claim 7 wherein a cheese like product is produced using a combination of dairy proteins and fat with or without the formation of a coagulum.

21. The method of claim 7 wherein fortified milk is used directly into the manufacture of process cheese products thereby skipping the formation of curds and whey.

22. Tile method of claim 7 wherein the milk is fortified with at least 14% additional dairy solids.

23. A method for reducing translucent cheese particles in a process cheese made from a cheese in which the cheese milk was fortified with additional dairy solids, the method comprising:
   acidifying the fortified cheese milk to a pH of approximately 6.6 to 5.75 under turbulent conditions; and
   thereafter using the cheese produced with the acidified fortified milk to make the process cheese product.

24. The method of claim 23 wherein the fortified milk is acidified after pasteurization.

25. The method of claim 23 wherein the fortified milk is acidified in line in a region of turbulent flow.

26. The method of claim 23 wherein the fortified milk is acidified to a pH range of approximately 6.5 to 6.1.

27. The method of claim 23 wherein the fortified milk is acidified with an organic or an inorganic acid or acid producing bacteria.

28. The method of claim 23 wherein the milk is fortified with at least 14% additional dairy solids.

* * * * *

UNITED STATES PATENT AND TRADEMARK OFFICE
CERTIFICATE OF CORRECTION

PATENT NO. : 6,902,750 B2
DATED : June 7, 2005
INVENTOR(S) : Eckert et al.

It is certified that error appears in the above-identified patent and that said Letters Patent is hereby corrected as shown below:

Column 8,
Line 7, "Tile method" should be -- The method --.

Signed and Sealed this

Eighteenth Day of April, 2006

JON W. DUDAS
*Director of the United States Patent and Trademark Office*